UNITED STATES PATENT OFFICE.

CHARLES BRUMBY, OF ROCHESTER, NEW YORK, ASSIGNOR TO HIMSELF AND JOHN NEEDHAM, JR., OF SAME PLACE.

IMPROVEMENT IN VARNISHES FOR LEATHER.

Specification forming part of Letters Patent No. 118,842, dated September 12, 1871.

*To all whom it may concern:*

Be it known that I, CHARLES BRUMBY, of the city of Rochester, in Monroe county and State of New York, have invented a new and useful Composition for Varnishing Leather and other materials; and I do hereby declare that the following is a full and exact description thereof, and of the manner of preparing and using the same.

My invention consists in the preparation of a varnish by the use of the following ingredients mixed together in the proportions substantially as hereinafter specified.

I dissolve eight ounces of gum-shellac and two ounces of gum-camphor in one pint of alcohol, and after these gums are thoroughly dissolved I add half an ounce of gum-myrrh, which should be dissolved or cut with one ounce of alcohol; and to these ingredients I add two ounces of lamp-black and one-quarter of an ounce of Prussian-blue. The whole mass is then well shaken together, at intervals of two or three hours, for a period of not less than two days, when the composition will be ready for use.

Instead of lamp-black, other coloring matter which can be reduced to an impalpable powder may be substituted, and thus various colors or tints may be given to the varnish for different uses.

This varnish has proven to be water-proof and very durable, retaining its gloss for a great length of time.

The effect of the gum-camphor and myrrh combined with the other ingredients modifies the condition of the shellac in the composition, so as to render the varnish more elastic, and also increases the drying period.

In using this new preparation it has been found well adapted for preserving leather, while it confers a very high degree of glossiness to its surface.

It is proper herein to state that the gum-myrrh may be dissolved with the gum-shellac in the first instance and substantially the same result will be attained.

This varnish may be applied with a brush or sponge, or in any other known manner.

Having fully described my new varnish, what I claim and desire to secure by Letters Patent, is—

A varnish composed of gum-shellac, gum-myrrh, gum-camphor, lamp-black or some equivalent coloring matter, Prussian-blue, and alcohol, in the proportions and prepared in the manner described.

In witness hereof I have hereunto set my hand this 17th day of July, 1871.

CHARLES BRUMBY.

Witnesses:
   H. P. K. PECK,
   JOHN NEEDHAM, JR. (80.)